US009632836B2

(12) United States Patent
Michel et al.

(10) Patent No.: US 9,632,836 B2
(45) Date of Patent: Apr. 25, 2017

(54) SCHEDULING APPLICATIONS IN A CLUSTERED COMPUTER SYSTEM

(71) Applicant: International Business Machines Corporation, Armonk, NY (US)

(72) Inventors: Eric Michel, Saint Aunes (FR); Nicolas Tallet, Montpellier (FR); Francois Thomas, Alencon (FR); Pascal Vezolle, Villeneuve les Maguelone (FR)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 14/741,751

(22) Filed: Jun. 17, 2015

(65) Prior Publication Data
US 2016/0004567 A1    Jan. 7, 2016

(30) Foreign Application Priority Data

Jul. 2, 2014 (GB) .................................. 1411757.6

(51) Int. Cl.
*G06F 9/46* (2006.01)
*G06F 9/50* (2006.01)

(52) U.S. Cl.
CPC .................................. *G06F 9/505* (2013.01)

(58) Field of Classification Search
CPC ..................................................... G06F 9/505
USPC ...................................................... 718/1–108
See application file for complete search history.

(56) References Cited

U.S. PATENT DOCUMENTS

| 7,773,522 | B2 | 8/2010 | Chafle et al. | |
|---|---|---|---|---|
| 8,265,973 | B2 | 9/2012 | Radhakrishnam | |
| 2006/0253715 | A1* | 11/2006 | Ghiasi | G06F 1/3203 713/300 |
| 2007/0150599 | A1 | 6/2007 | Neogi et al. | |
| 2008/0028075 | A1* | 1/2008 | Dini | G06F 9/505 709/226 |

(Continued)

OTHER PUBLICATIONS

Hamscher, Volker, et al. "Evaluation of job-scheduling strategies for grid computing." International Workshop on Grid Computing. Springer Berlin Heidelberg, 2000. pp. 1-12.*

(Continued)

*Primary Examiner* — Satish Rampuria
(74) *Attorney, Agent, or Firm* — Daniel Simek; Hoffman Warnick LLC

(57) ABSTRACT

Disclosed is a method for scheduling applications for a clustered computer system having a plurality of computers and at least one resource, the clustered computer system executing one or more applications. A method includes: monitoring hardware counters in at least one of the resources and the plurality of computers of the clustered computer system for each of the applications; responsive to said monitoring, determining the utilization of at least one of the resources and the plurality of computers of the clustered computer system by each of the applications; for each of the applications, storing said utilization of at least one of the resource and plurality of computers of the clustered computer system; and upon receiving a request to schedule an application on one of said computers, scheduling a computer to execute the application based on stored utilization for the application and stored utilizations of other applications executing on the computers.

18 Claims, 6 Drawing Sheets

(56) References Cited

U.S. PATENT DOCUMENTS

| | | | | |
|---|---|---|---|---|
| 2008/0104605 | A1* | 5/2008 | Steinder | G06F 9/5033 718/104 |
| 2008/0270199 | A1* | 10/2008 | Chess | G06F 9/505 705/7.26 |
| 2009/0165004 | A1* | 6/2009 | Moses | G06F 9/505 718/102 |
| 2011/0083131 | A1 | 4/2011 | Pirzada et al. | |
| 2012/0246638 | A1 | 9/2012 | He et al. | |
| 2012/0317578 | A1 | 12/2012 | Kansal et al. | |
| 2013/0185433 | A1 | 7/2013 | Zhu et al. | |
| 2013/0275598 | A1 | 10/2013 | Hohenstein et al. | |
| 2014/0068627 | A1 | 3/2014 | Goh et al. | |

OTHER PUBLICATIONS

Buyya, Rajkumar, Rajiv Ranjan, and Rodrigo N. Calheiros. "Intercloud: Utility-oriented federation of cloud computing environments for scaling of application services." International Conference on Algorithms and Architectures for Parallel Processing. Springer Berlin Heidelberg, 2010. pp. 1-20.*

Isard, Michael, et al. "Quincy: fair scheduling for distributed computing clusters." Proceedings of the ACM SIGOPS 22nd symposium on Operating systems principles. ACM, 2009. pp. 261-276.*

UK Intellectual Property Office, Search Report under Section 17(5) for Application No. GB1411757.6 mailed Dec. 17, 2014, 4 pages.

Canali et al., "Automated Clustering of Virtual Machines based on Correlation of Resource Usage," 2012, 8 pages, retrieved from weblab.ing.unimo.it.

Eillhalm et al., "Intel Performance Counter Monitor—A Better Way to Measure CPU Utilization," Submitted Aug. 2012, last updated Dec. 2014. 26 pages, retrieved from www.intel.com/software/pcm.

Vu Do et al., "Profiling Applications for Virtual Machine Placement in Clouds," 2011, pp. 660-667, 2011 IEEE 4th International Conference on Cloud Computing.

Lee, "Smart System Resource Monitoring in Cloud," 2012, pp. 34-42. iBusiness 2012, vol. 4. Scientific Research.

* cited by examiner

SCHEDULING APPLICATIONS IN A CLUSTERED COMPUTER SYSTEM

FIELD OF THE INVENTION

The present invention relates to scheduling applications in a clustered computer system, and more particularly to scheduling applications such that an application is assigned to a compute node executing one or more complementary applications.

BACKGROUND

Commodity cluster computing is being used more widely especially in high performance and technical computing. Commodity cluster computing is the use of large numbers of readily available computing components for parallel computing to get the largest amount of useful computation at low cost. Commodity cluster computing uses multiple low cost, low performance commodity computers working in parallel instead of using fewer high-performance and high-cost computers. Commodity computers are computer systems manufactured by multiple vendors, incorporating components based on open standards.

Clustered computer systems comprise multiple compute nodes interconnected through with high speed network connections. The compute nodes can be heterogeneous with different type of processors, number of cores, memory size, type and speed. Some compute nodes can have accelerator technologies such as Field Programmable Gate Array (FPGA), General-Purpose computing on Graphics Processing Units (GPGPU) and co-processors. For economic and technical reasons most of these clustered computer systems access stored data through a shared parallel file system and therefore through network connections. Each compute node can read and write data at the speed of the network connections and the global performance of a parallel application depends on the number of network connections, which is implicitly related to the number of compute nodes.

Applications are submitted to the clustered computer system through scheduling software which monitors, orchestrates and manages the resources of the clustered computer system in an optimal manner. The resources of the clustered computer system are allocated based on policies, free resources and application requirements in a way in which the global utilization of the clustered computer system and/or user response times are optimized. The policies may include, for example, priorities, resource usage and resource allocation per user, per group or per application. The application requirements may include, for example, the number of cores, the number of compute nodes, the amount of memory, the total time or the location of the data.

Prior art solutions are not able to correlate, in real time, the real hardware resource consumption rates with application performance characteristics or needs. Examples of hardware resource consumption rates include network usage, disk I/O, memory and cache usage, register usage, usage of floating and instruction units, usage of PCI bus and the like The scheduling of applications does not take into account the resources needs and the behavior of the applications executing within the clustered computer system.

Another key challenge for parallel applications is to optimize the usage of the network connections. The best performance is generally obtained by maximizing the network performance and therefore the number network connections. The number of network connections is implicitly related to the number of compute nodes. In this configuration the scheduling software must find the balance between the number of processes per compute node and the number of compute nodes while optimizing the whole workload. This is possible only by analyzing the compatibility of the applications versus the available resources.

United States Patent Application 2014/0068627, which is hereby incorporated by reference, discloses a method for policy-based self-control and healing by adjusting workloads dynamically on a plurality of resources in the data center according to a set of policy rules. Thresholds or trends corresponding to target operational limits are used in some embodiments; they may be included in the set of policy rules. For example, a threshold may trigger the distribution or re-distribution of workloads in the data center dynamically when the threshold is approached or exceeded. It does not disclose the use of real analytics tool using, for instance, times series, for hardware components and utilization.

"Intel Performance Counter Monitor—A better way to measure CPU utilization" at https://software.intel.com/en-us/articles/intel-performance-counter-monitor-a-better-way-to-measure-cpu-utilization discloses "CPU resource"-aware scheduling. A simple scheduler executes 1000 compute intensive and 1000 memory-bandwidth intensive jobs in a single thread. The challenge was the existence of non-predictable memory-band intensive background load on the system, a rather typical situation in modern multi component systems with many third party components. The scheduler detects that a lot of the memory bandwidth is currently used by memory-bandwidth intensive jobs and can schedule other compute intensive jobs to execute at the same time as the memory-band intensive background activity with the memory-bandwidth intensive jobs being scheduled between the memory-band intensive background activity. A single thread only in a single computer is scheduled and only memory and compute use are monitored.

BRIEF SUMMARY OF THE INVENTION

Embodiments of the invention provide a method for scheduling applications for use in a clustered computer system comprising a plurality of computers and at least one resource, the clustered computer system executing one or more applications, the method comprising the steps of: monitoring one or more hardware counters in at least one of the at least one resource and the plurality of computers of the clustered computer system for each of the one or more applications; responsive to said step of monitoring, determining the utilization of at least one of the at least one resource and the plurality of computers of the clustered computer system by each of the one or more applications; for each of the one or more applications, storing said utilization of at least one of the at least one resource and the plurality of computers of the clustered computer system; and upon receiving a request to schedule an application on one of said plurality of computers, scheduling a computer to execute the application based on said stored utilization for the application and stored utilizations of other applications executing on the plurality of computers. The method provides the advantage that scheduling of applications may be performed using real time hardware resource utilization data to optimize the scheduling.

In an embodiment of the invention, responsive to the application for which a scheduling request is received being an application being executed on the clustered computer system for the first time, the method further comprises the step of estimating the utilization of at least one of the at least one resource and the plurality of computers of the clustered computer system. This embodiment has the advantage of using the previously stored utilization data for other applications to allow more efficient scheduling of an application being executed for the first time.

In another embodiment of the invention, utilization data from a plurality of resources and a plurality of computers of the clustered computer system is consolidated in a plurality of master agents before communication to a collector agent which carries out said step of storing said utilization data. The use of a plurality of master agents to consolidate the utilization data has the advantages of scalability, easier collection of data at an application level, improved efficiency and easier integration of added computer nodes to the clustered computer system.

In a further embodiment of the invention, said step of scheduling a computer to execute the application based on said stored utilization for the application and stored utilizations of other applications executing on the plurality of computers schedule a computer currently executing an application having complementary utilization of resources.

Another embodiment of the invention further comprises the step of estimating the effect on utilization rate and throughput of changes to the allocation of said at least one resource and said plurality of computers. The collection of real time utilization data means that data is available to allow such estimation.

In another embodiment of the invention, said step of scheduling a computer to execute the application comprises correlating the stored utilization data and hardware utilization time series, available resources, the applications running on each computer in the cluster of computers with their current cluster resource consumption rates and history, the submission policies and user requirements.

Embodiments of the invention further provide a system for scheduling applications for use in a clustered computer system comprising a plurality of computers and at least one resource, the clustered computer system executing one or more applications, at least one of the at least one resource and the plurality of computers having one or more hardware counters for monitoring hardware utilization, the system comprising: an agent for monitoring said one or more hardware counters for each of the one or more applications; an application monitoring subsystem for determining the utilization of at least one of the at least one resource and the plurality of computers of the clustered computer system by each of the one or more applications; and an engine and repository for storing said utilization of at least one of the at least one resource and the plurality of computers of the clustered computer system for each of the one or more applications and for, upon receiving a request to schedule an application on one of said plurality of computers, scheduling a computer to execute the application based on said stored utilization for the application and stored utilizations of other applications executing on the plurality of computers.

Embodiments of the invention further provide a computer program product for scheduling applications for use in a clustered computer system comprising a plurality of computers and at least one resource, the clustered computer system executing one or more applications, the computer program product comprising: a computer readable storage medium having computer readable program code embodied therewith, the computer readable program code adapted to perform the method described above when said program is run on a computer.

BRIEF DESCRIPTION OF THE DRAWINGS

Preferred embodiments of the present invention will now be described in more detail, by way of example only, with reference to the accompanying drawings, in which.

DETAILED DESCRIPTION OF THE EMBODIMENTS

Figure 1:
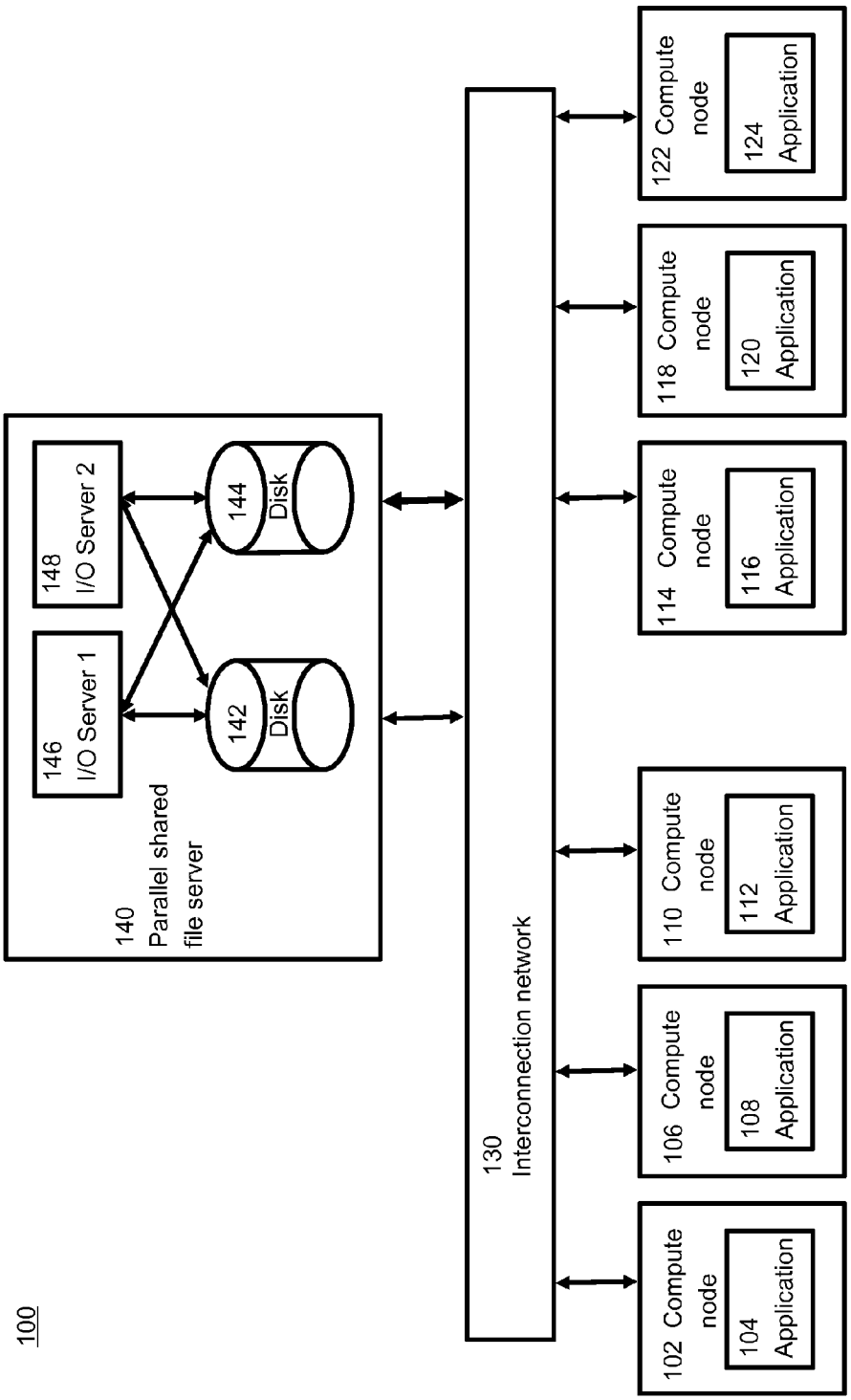
FIG. 1 shows a prior art computer cluster system.
Figure 2:
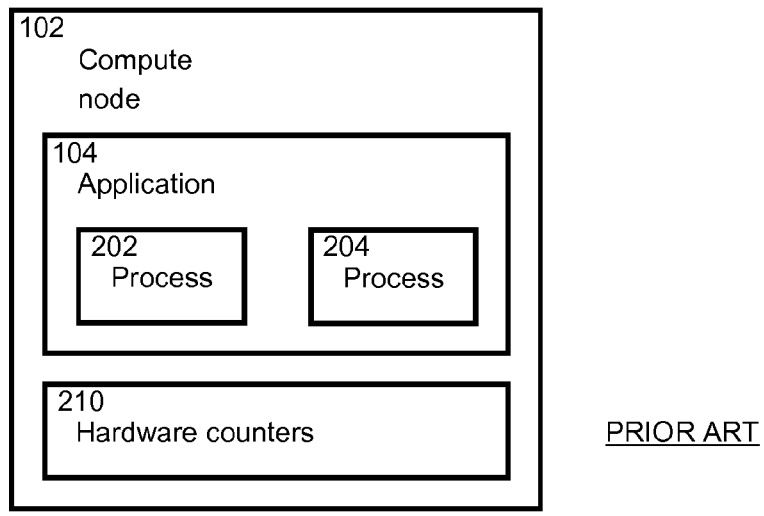
FIG. 2 shows a prior art compute node of the prior art computer cluster system FIG. 1.
Figure 3:
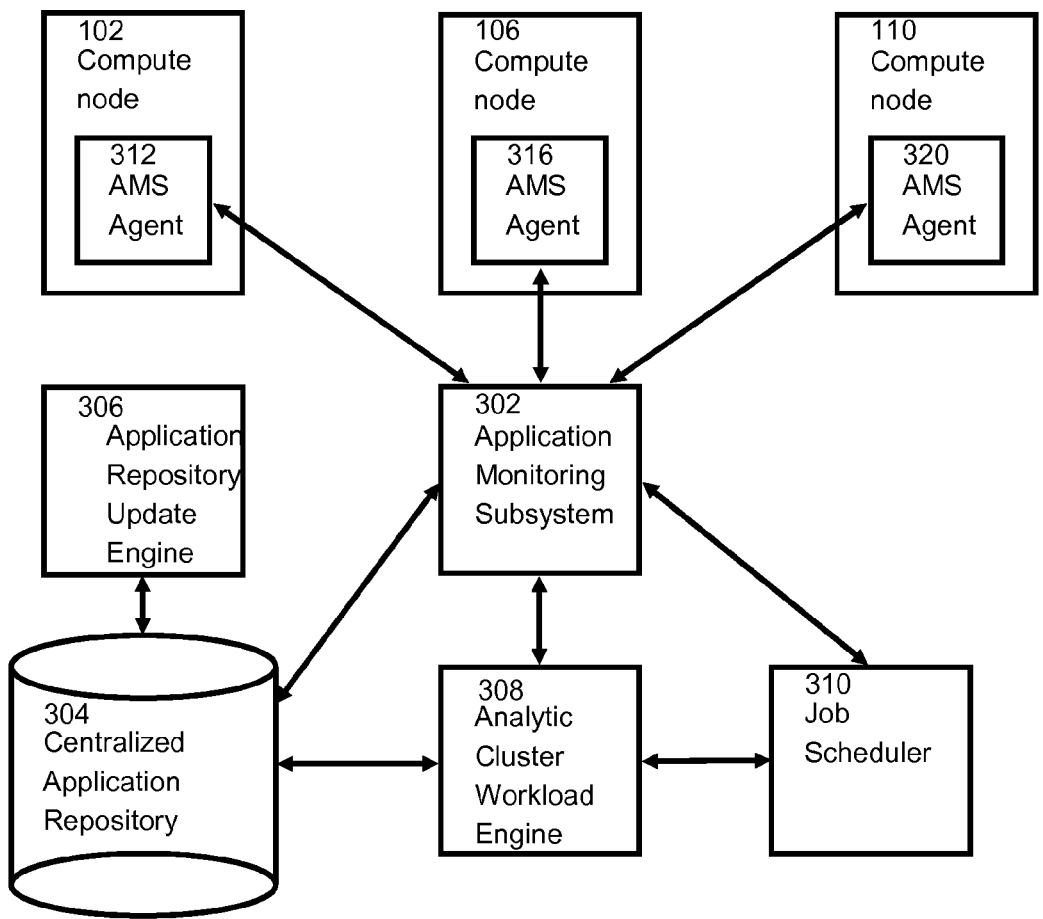
FIG. 3 shows a first embodiment of an analytic resource scheduling engine according to the present invention.
Figure 4:
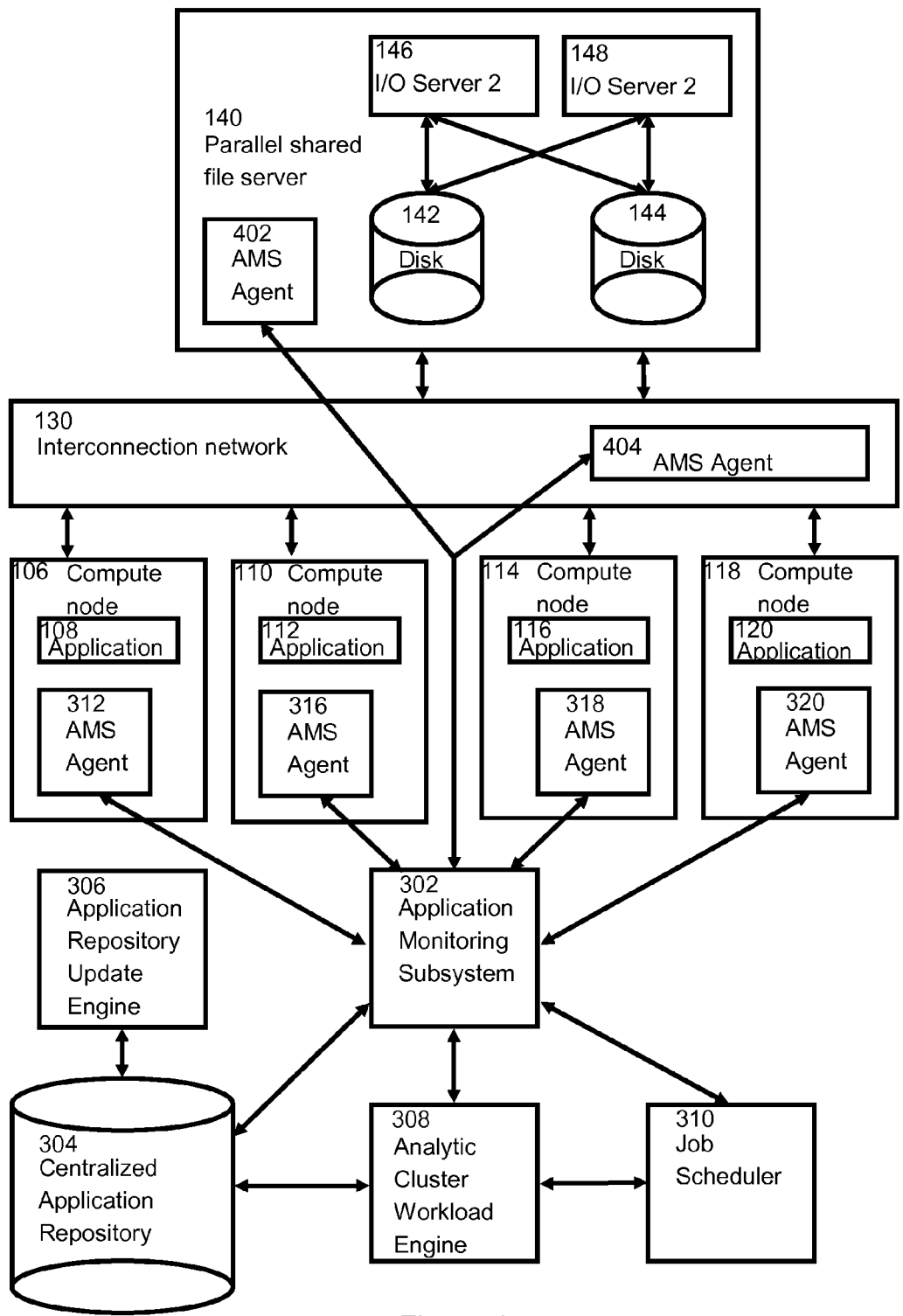
FIG. 4 shows the analytic resource scheduling engine of FIG. 3 interacting with the computer cluster system of FIG. 1.

FIG. 1 shows prior art clustered computer system 100. Multiple compute nodes 102, 106, 110, 114, 118, 122 are connected to each other through interconnection network 130. Each compute node 102, 106, 110, 114, 118, 122 executes one or more applications 104, 108, 112, 116, 120, 124. Although each compute node 102, 106, 110, 114, 118, 122 in FIG. 1 is shown as executing a single application, a compute node 102, 106, 110, 114, 118, 122 will typically execute more than one application 104, 108, 112, 116, 120, 124. Although six compute nodes 102, 106, 110, 114, 118, 122 are shown in FIG. 1, embodiments of the present invention may be implemented in clustered computer systems 100 having any number of compute nodes 102, 106, 110, 114, 118, 122. The drawings of FIGS. 2, 3 and 4 show six, three and four compute nodes 102, 106, 110, 114, 118, 122 respectively. The compute nodes 102, 106, 110, 114, 118, 122 can be heterogeneous with different type of processors, number of cores, memory size, type and speed. Also connected to interconnection network 130 is parallel shared file server 140. Parallel shared file server 140 comprises disks 142, 144 and I/O servers 146, 148. In the arrangement of FIG. 1, each of the I/O servers 146, 148 may serve data from either one of the disks 142, 144. Although two disks 142, 144 and two I/O servers 146, 148 are shown in FIG. 1, embodiments of the present invention may be implemented in clustered computer systems 100 having any number of disks 142, 144 and I/O servers 146, 148.

FIG. 2 shows a block diagram of a compute node 102 of FIG. 1 with one application 104. Application 104 may comprise one or more processes 202, 204. As mentioned above, a compute node 102 will typically execute more than one application 104. Also shown in compute node 102 are hardware counters 210.

Hardware performance counters, or hardware counters 210, are a set of special-purpose registers built into modern microprocessors to store the counts of hardware-related activities within computer systems. Advanced users often rely on those counters to conduct low-level performance analysis or tuning. The number of available hardware counters 210 in a processor is limited, but each CPU model may have many different events that a developer might like to measure. Each hardware counter 210 can be programmed with the index of an event type to be monitored, for example, a L1 cache miss or a branch misprediction. In alternative embodiments, the hardware counters may be partially or entirely implemented in software in the processor using low level code as will be familiar to the person skilled in the art.

In order to optimize the efficiency of two processes 202, 204 from a single or several applications 104 running on the same compute node 102, embodiments of the present invention do not execute processes stressing the same resource of the compute node 102, such as, for example, the floating point unit, memory bandwidth, caches, network connections and the like. Instead, embodiments of the present invention assign complementary processes to a compute node 102, for example, a CPU oriented application together with a memory oriented application.

Referring to FIG. 3, embodiments of the present invention monitor, trace and submit applications in a clustered computer system 100 to optimize productivity and application (104 in FIGS. 1 and 2) performance. Application Monitoring Subsystem (AMS) 302 communicates with AMS Agents 312, 316, 320 located in each of the computing nodes 102, 106, 110 to obtain utilization data. Such communication may be wired or wireless and may use any protocol which is understood by each of the parties to the communication. The utilization data is stored by the AMS 302 in Centralized Application Repository (CAR) 304. When an application 104 finishes execution the utilization data for that application 104 stored in the CAR 304 is analyzed and correlated by the Application Repository Update Engine (ARUE) 306 with the current data in the CAR 304. Although FIG. 3 shows three compute nodes 102, 106, 110 embodiments of the present invention may be implemented in clustered computer systems 100 having any number of compute nodes 102, 106, 110.

When a job is submitted for scheduling, the Job Scheduler 310 calls the Analytic Cluster Workload Engine (ACWE) 308 which determines using data in the CAR 304 which of the compute nodes 102, 106, 110 the job should be allocated to. The Job Scheduler 310 is a conventional job scheduler.

Although AMS 302, CAR 304, ARUE 306, ACWE 308 and Job Scheduler 310 are shown as separate entities, embodiments of the invention may combine one or more of these entities.

Referring to FIG. 4, the embodiment of the present invention of FIG. 3 is shown combined with the prior art cluster computer system of FIG. 1. Although FIG. 4 shows four compute nodes 106, 110, 114, 118 embodiments of the present invention may be implemented in clustered computer systems 100 having any number of compute nodes 106, 110, 114, 118. AMS Agents 402, 404 are located in the parallel shared file server 140 and the interconnection network 130 of FIG. 1 to similarly monitor the utilization rates and patterns of usage by each application 108, 112, 116, 120. Although FIG. 4 shows an AMS Agent 402, 404 in the parallel shared file server 140 and the interconnect network 130, AMS Agents may be located in any other resource used by the compute nodes 106, 110, 114, 118.

Figure 5:
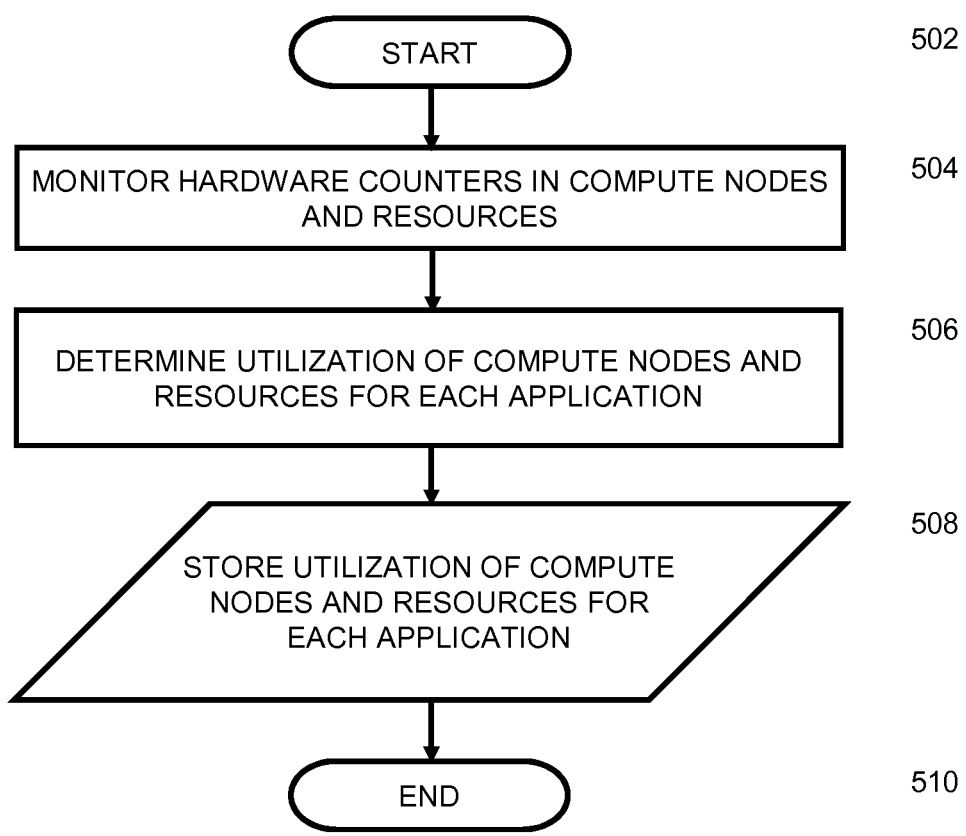
FIG. 5 shows a flow chart of the interaction of FIG. 4 to generate utilization data.

FIG. 5 shows a flow chart of embodiments of methods of the present invention to generate utilization data. The method starts at step 502.

At step 504, hardware counters (210 in FIG. 2) located in compute nodes 106, 110, 114, 118 and in resources such as the parallel shared file server (140 in FIG. 1) and the interconnection network (130 in FIG. 1) are monitored by the AMS Agents 316, 320, 324, 328, 402, 404. The hardware counters (210 in FIG. 2) are used to determine the real hardware utilization rates and frequencies/patterns for each application 108, 112, 116, 120, such as, for example, instruction counts, integer unit usage, load/store unit usage, branch and float point unit usage, register usage, cache usage, memory usage, network usage, PCI bus usage, I/O usage including local disks and shared file systems, as well as CPU usage, communication usage and I/O profiling. Typically, this monitoring may be by time sampling, that is sampling the hardware counters at time intervals, rather than continuous monitoring. The utilization data collected by the AMS Agents 316, 320, 324, 328 may be sent during runtime or it may be sent at the end of execution of a process 202, 204 or at the end of execution of an application 108, 112, 116, 120. The hardware counters (210 in FIG. 2) collect utilization data at a process level (as well as at a thread level). The AMS Agents 316, 320, 324, 328, 402, 404 send the collected utilization data to the AMS 302.

The utilization data collected by the AMS Agents 316, 320, 324, 328 is stored by the AMS 302 in Centralized Application Repository (CAR) 304. The utilization data is used to define the behavior of any application 106, 110, 114, 118 in terms of utilization of any of the clustered computer system 100 resources 106, 110, 114, 118, 130, 140. In an embodiment, depending on the size of the clustered computer system, the CAR 304 may be integrated with the AMS 302.

At step 506, the ARUE 306 analyzes and correlates the collected utilization data in order to determine the utilization of compute nodes 106, 110, 114, 118 and resources 130, 140 for each application 106, 110, 114, 118. When an application 106, 110, 114, 118 finishes execution the utilization data for that application 106, 110, 114, 118 stored in the CAR 304 is analyzed by the Application Repository Update Engine (ARUE) 306 by generating a new time series for the utilization of hardware resources, such as cores, nodes, network cards, memory, caches, registers, floating point units, instruction units and the like. Information about the utilization for each application may, optionally, be broken down into usage per node, per process 202, 204 and/or per thread. A time series is a sequence of data points, measured typically at successive points in time spaced at uniform time intervals.

The ARUE 306 uses the time series to analyze and predict the best performance of an application 108 for a given set of hardware resources whilst optimizing the overall productivity of the clustered computer system 100. It may do this by, for example, defining applications 108, 112, 116, 120 which are compatible with each other. In this context, compatibility between applications 108, 112, 116, 120 means that hardware usage by each of the compatible applications 108, 112, 116, 120 is optimized. For example, a first application 108 which uses mainly the interconnection network 130 and not the processors within the compute nodes 106, 110, 114, 118 could share a compute node 106, 110, 114, 118 with a second application which is limited by processor usage. The predominant usage of the interconnection network 130 by the first application 108 does not affect the predominant usage of the processor by the second application. This improves both the usage of the hardware resources and the response time provided by each of the applications 108, 112, 116, 120. As an example of such analysis, the impact of changing the hardware resources available to an application 108, 112, 116, 120 may be determined, such as availability of more network cards or of more L3 caches.

The ARUE 306 also correlates the utilization data with the current data in the CAR 304. Such correlation may be, for example, the prediction or estimation for the duration of the application execution of the real utilization of the hardware resources and what the performance impact of a given hardware allocation is. The aim of this is to share resources over time between compatible applications, as well as optimizing the hardware resources per application to get optimal utilization rate and throughput.

At step 508, the ARUE 306 stores the utilization of the compute nodes 106, 110, 114, 118 and resources 130, 140 for each application 108. The method ends at step 510.

Figure 6:
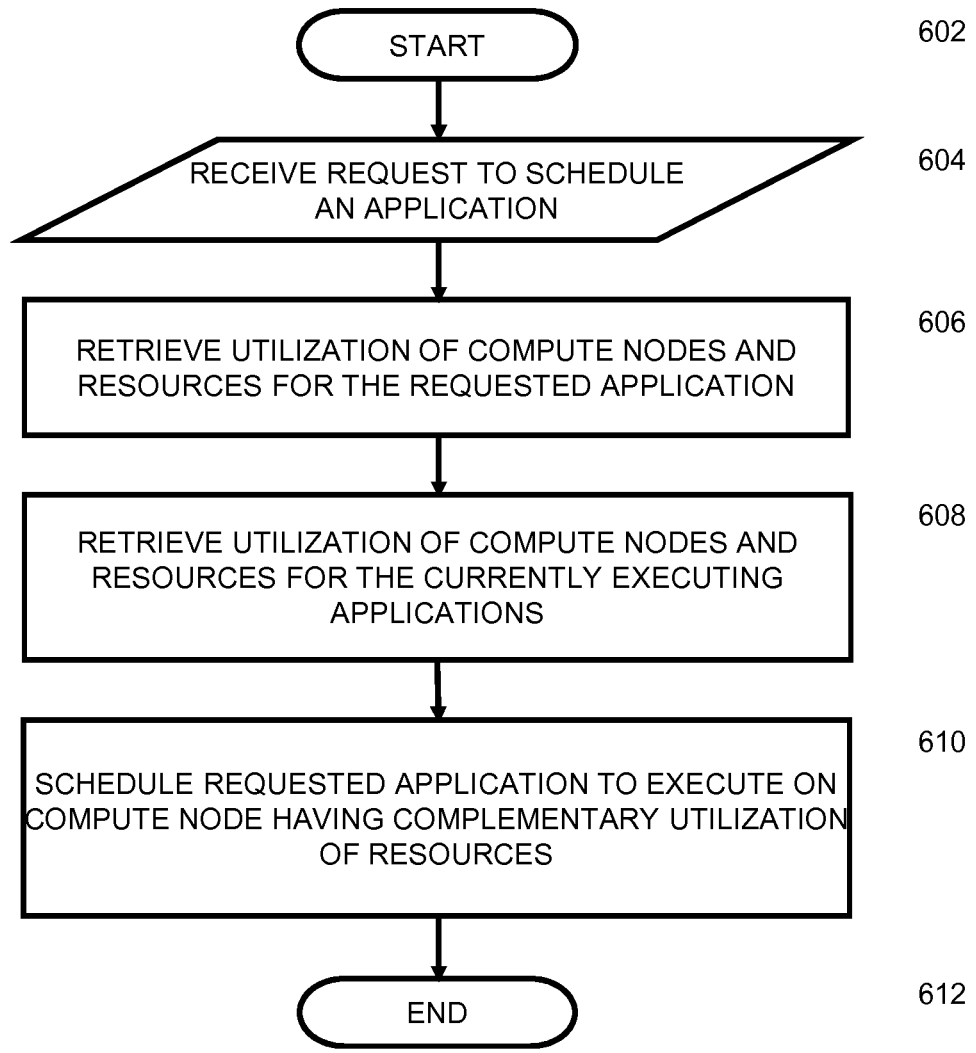
FIG. 6 shows a flow chart of the interaction of FIG. 4 to schedule execution of applications.

FIG. 6 shows a flow chart of embodiments of methods of the present invention to schedule execution of applications. The method starts at step 602.

At step 604, when a job is submitted for scheduling, the Job Scheduler 310 sends a request to the Analytic Cluster Workload Engine (ACWE) 308 to schedule the application 104. ACWE 308 requests information from the Job Scheduler 310 as to scheduling policies and as to which jobs are executing or are pending. The ACWE 308 determines using data in the CAR 304 according to the method described below which of the compute nodes 106, 110, 114, 118 the job should be allocated to.

At step 606, the ACWE 308 retrieves from CAR 304 the stored utilization data of compute nodes 106, 110, 114, 118 and resources 130, 140 for the requested application 108.

At step 608, the ACWE 308 retrieves the stored utilization data of compute nodes 106, 110, 114, 118 and resources 130, 140 for the currently executing applications 108, 112, 116, 120.

At step 610, the ACWE 308 schedules the requested application to execute on compute node 106, 110, 114, 118 or cores having complementary utilization of resources. The ACWE 308 does this by taking into account:
(i) All the standard scheduling parameters for the submitted job, such as policies (scheduling batch queues, priorities), user requirements (number of cores, memory required, total times and dependencies;
(ii) Jobs already in the queue for execution: both running and pending;
(iii) Available clustered computer system 100 resources; and
(iv) Current clustered computer system 100 resources workload from the monitoring subsystem for each application as well as the stored data in the CAR 304.

Factors (i) to (iii) above are conventional and will be very familiar to those skilled in the art. Factor (iv) above is taken into account using embodiments of the present invention.

As mentioned about, the CAR 304 contains, for a given application 106, 110, 114, 118, the utilization rates of the hardware resources (registers, computing units, branch units, caches, memory, network and the like) using collections of time series (or any other approach allowing the storage data with respect to time) from previous executions of the application 106, 110, 114, 118. These collections of time series provide the utilization of the clustered computer system 100 resources for one execution, that is, one application configuration typically comprising the number of threads, the number of processes, the number of cores, nodes or the like allocated.

For an application being executed for the first time, because of the availability of this stored data, it is possible for the ACWE 308 to make estimations or predictions of the hardware resource usage of the new application being executed for the first time. ACWE 308 estimates execution times of applications by analyzing the impact of hardware resources on the execution time. This may be, for example, given a number of cores what is the estimated execution time of the application for different numbers of network cards or for different memory bandwidth, processor frequency, network latency and the like. Based on the free clustered computer system 100 resources and the policies sent by the job scheduler 310, ACWE 308 estimates the best clustered computer system 100 resource utilization. As well as knowing the free hardware resources and the policies, ACWE 308 is able to take into account in the analysis the demands of other applications 106, 110, 114, 118 and the current hardware utilization obtained from the AMS 302. As with any analytic engine the precision and efficiency of the analysis increases over time.

The ACWE 308 determines the cluster resource allocation and submission time (or position in the submission queues) These are used as key parameters in determining scheduling policies and algorithms, such as, for example, backfill or fair share algorithms. The ACWE 308 analyzes and correlates the hardware utilization rates using serial values and time series for all applications 104, 108, 112, 116, 120, 124, whether running, pending, queued or submitted.

The ACWE 308 analyzes the current utilization of the clustered computer system 100 and makes predictions of the running workload over a coming period of time including using the analysis completed and stored for the application for which scheduling has been requested. Anticipated utilization data was stored by the ACWE 308 at the time of receipt of the request from Job Scheduler 310.

Using the information obtained at steps 604 to 608, the AWCE 308 defines the best clustered computer system 100 resource allocation, as well as the scheduling time, priority and execution time. The AWCE 308 sends allocation configuration and scheduling data to the Job Scheduler 310 and stores locally the analysis and data. The ACWE 308 receives and stores the utilization data for the duration of the execution of the application 108, 112, 116, 120. When the application 108, 112, 116, 120 completes execution, the AWCE 308 gets a signal from AMS 302 and the Job Scheduler 310 validates and corrects the estimated utilization data. The ACWE 308 then send the validated and corrected utilization data to the ARUE 306 to enable the ARUE 306 to update the CAR 304. The ACWE 308 then removes its local stored analysis.

This analysis and correlation may, for example, be based on the utilization rates for each of the cluster 100 hardware resources. An application 104 which uses 100% of a floating point unit cannot optimally share a core with another application, or at least may share only with another application that does not use the floating point unit.

ACWE 308 analyzes the utilization of each of the hardware resources over time (time series). Hardware counters and sensors allow the exact utilization of hardware resources to be monitored and so determine the utilization rates of the hardware resources. In another example of optimization, for an application 108, 112, 116, 120 depending mainly on network bandwidth. ACWE 308 analyzes over a period of time the current and potential utilization of the interconnection network 130 in order to define what would be the optimal resource allocation network, type of node and the like, for the application 104 to get the best execution response time and cluster utilization.

Prior art schedulers do not try to spread processes between compute nodes 106, 110, 114, 118 to increase the number of network interfaces within the interconnection network 130 because prior art schedulers do not have information about the behavior of the applications 108, 112, 116, 120 and so are not able to populate compute nodes 106, 110, 114, 118 with complementary applications 108, 112, 116, 120.

The hardware utilization rates depend on the time (execution duration) and for most of them, the hardware utilization rates give in percent of utilization for all the hardware components: instruction units/pipes/queues, load and store units, branch units, integer and float points units (scalar and vector), register utilization, caches (all levels) and memory size utilization and misses, network, internal and external bus utilization. Some other parameters are also monitored and collected like the type of communications (point-to-point, collective, non blocking, size . . . ), computation/communication ratios and IO.

In an embodiment, the AMS 302 and the ACWE 308 may be integrated with the job scheduler 310 or they may interoperate with it.

Figure 7:
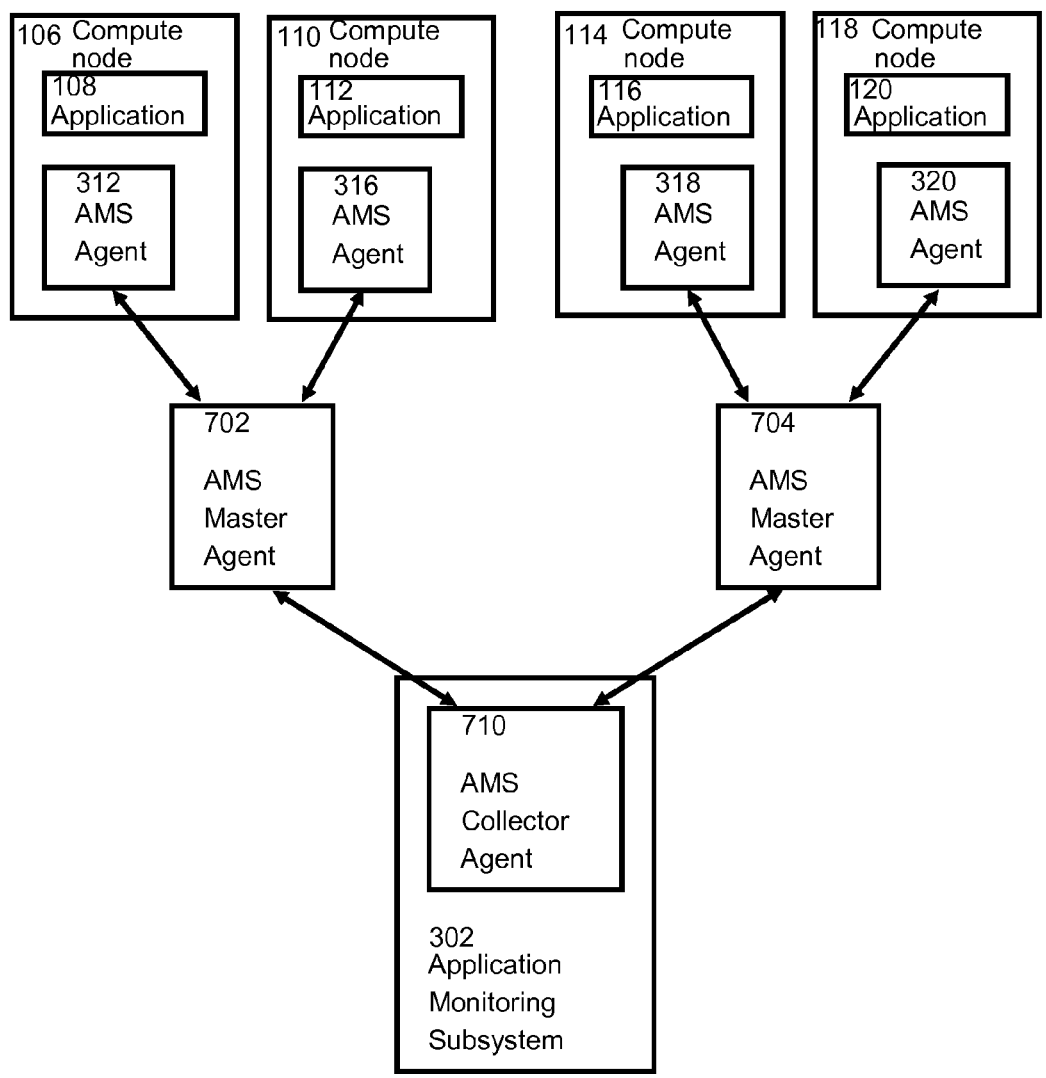
FIG. 7 shows a second embodiment of an analytic resource scheduling engine according to the present invention.

Referring to FIG. 7, a second embodiment of an analytic resource scheduling engine according to the present invention is shown. Compute nodes 106, 110, 114, 118, applications 108, 112, 116, 120, AMS Agents 316, 320, 324, 328 and Application Monitoring System (AMS) 302 correspond to the same numbered entities in FIGS. 3 and 4. In the second embodiment, instead of Application Monitoring Subsystem (AMS) 302 communicating directly with AMS Agents 316, 320, 324, 328 located in each of the computing nodes 106, 110, 114, 118 to obtain utilization data, AMS 302 communicates with each of the AMS Agents 316, 320, 324, 328 located in each of the compute nodes 106, 110, 114, 118 through an AMS Collector Agent 710 and AMS Master Agents 702, 704. FIG. 7 shows two AMS Agents 316, 320, 324, 328 connected to each AMS Master Agent 702, 704 and two AMS Master Agents 702, 704 connected to the AMS Collector Agent 710, but in embodiments of the present invention, any number of AMS Agents 316, 320, 324, 328 may be connected to each AMS Master Agent 702, 704 and any number of AMS Master Agents 702, 704 may be connected to the AMS Collector Agent. Not shown in FIG. 7 are the CAR 304, ARUE 306, ACWE 308 and Job Scheduler 310 of FIG. 3. Also not shown in FIG. 7 are Interconnection network 130 and Parallel shared file server 140. All of these perform the same functions as described above with respect to FIG. 3.

The second embodiment has the advantages of scalability, easier collection of data at an application level, improved efficiency and easier integration of added compute nodes 106, 110, 114, 118 to a clustered computer system 100.

With an increasing number of compute nodes 106, 110, 114, 118 in a clustered computer system 100 it is not possible to have all AMS Agents 316, 320, 324, 328 connected directly to a central AMS 302. The use of AMS Master Agents 702, 704 allows an increased number of compute nodes 106, 110, 114, 118 to be used.

As applications typically comprise multiple threads and processes executing in parallel, each of the AMS Agents 316, 320, 324, 328 see only threads or processes 202, 204 executing on the local compute node 106, 110, 114, 118, the threads or processes 202, 204 forming only a small part of the applications 108, 112, 116, 120. The AMS Master Agents 702, 704 can gather data on the hardware utilization at an application level whilst the AMS Agents 316, 320, 324, 328 monitor hardware utilization at the thread and process 202, 204 levels.

The use of AMS Master Agents 702, 704 means that AMS Agents 316, 320, 324, 328 do not need to communicate with each other and so system and network utilization is improved.

The use of one AMS Agent 316, 320, 324, 328 per compute node 106, 110, 114, 118 and separate AMS Master Agents 702, 704 means that integration of new compute nodes 106, 110, 114, 118 into the clustered computer system 100 can be completed more efficiently and easily.

Although the exemplary embodiment of FIG. 7 shows a first level of AMS Agent 316, 320, 324, 328 and a second level of Master Agent 702, 704, other embodiments may use additional levels, such as a third or even a fourth level if there are sufficient compute nodes 106, 110, 114, 118 so as to make such an arrangement more efficient.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for scheduling applications for use in a clustered computer system comprising a plurality of computers and at least one resource, the clustered computer system executing one or more applications, the method comprising the steps of:

monitoring one or more hardware counters in at least one of the at least one resource and the plurality of computers of the clustered computer system for each of the one or more applications;

responsive to said step of monitoring, determining the utilization of at least one of the at least one resource and the plurality of computers of the clustered computer system by each of the one or more applications;

for each of the one or more applications, storing said utilization of at least one of the at least one resource and the plurality of computers of the clustered computer system; and upon receiving a request to schedule an application on one of said plurality of computers, scheduling a selected computer to execute the application based on said stored utilization for the application and stored utilizations of other applications executing on the plurality of computers, wherein the selected computer is determined by identifying applications on the plurality of computers that are compatible with the application to be scheduled, and assigning the application to a computer having a compatible application;

wherein applications are deemed compatible if each application utilizes predominately different resources.

2. The method as claimed in claim 1, wherein responsive to the application for which a scheduling request is received being an application being executed on the clustered computer system for the first time, the method further comprises the step of estimating the utilization of at least one of the at least one resource and the plurality of computers of the clustered computer system.

3. The method as claimed in claim 1, wherein utilization data from a plurality of resources and a plurality of computers of the clustered computer system is consolidated in a plurality of master agents before communication to a collector agent which carries out said step of storing said utilization data.

4. The method as claimed in claim 1, wherein said step of scheduling a computer to execute the application based on said stored utilization for the application and stored utilizations of other applications executing on the plurality of computers schedule a computer currently executing an application having complementary utilization of resources.

5. The method as claimed in claim 1, further comprising the step of estimating the effect on utilization rate and throughput of changes to the allocation of said at least one resource and said plurality of computers.

6. The method as claimed in claim 1, wherein said step of scheduling a computer to execute the application comprises correlating the stored utilization data and hardware utilization time series, available resources, the applications running on each computer in the cluster of computers with their current cluster resource consumption rates and history, the submission policies and user requirements.

7. A system for scheduling applications for use in a clustered computer system comprising a plurality of computers and at least one resource, the clustered computer system executing one or more applications, at least one of the at least one resource and the plurality of computers having one or more hardware counters for monitoring hardware utilization, the system comprising:

a memory and a processor;

an agent, executable by the processor, for monitoring said one or more hardware counters for each of the one or more applications;

an application monitoring subsystem, executable by the processor, for determining the utilization of at least one of the at least one resource and the plurality of computers of the clustered computer system by each of the one or more applications; and an engine, executable by the processor, and repository for storing said utilization of at least one of the at least one resource and the plurality of computers of the clustered computer system for each of the one or more applications and for, upon receiving a request to schedule an application on one of said plurality of computers, scheduling a selected computer to execute the application based on said stored utilization for the application and stored utilizations of other applications executing on the plurality of computers, wherein the selected computer is determined by identifying applications on the plurality of computers that are compatible with the application to be scheduled, and assigning the application to a computer having a compatible application;

wherein applications are deemed compatible if each application utilizes predominately different resources.

8. The system as claimed in claim 7, wherein the engine, responsive to the application for which a scheduling request is received being an application being executed on the clustered computer system for the first time, for estimating the utilization of at least one of the at least one resource and the plurality of computers of the clustered computer system.

9. The system as claimed in claim 7, further comprising a plurality of master agents for consolidating utilization data from a plurality of resources and a plurality of computers of the clustered computer system before communication to the application monitoring system.

10. The system as claimed in claim 7, wherein said engine schedules the application to execute on a computer currently executing an application having complementary utilization of resources, based on said stored utilization for the application and stored utilizations of other applications executing on the plurality of computers.

11. The system as claimed in claim 7, further wherein the engine estimates the effect on utilization rate and throughput of changes to the allocation of said at least one resource and said plurality of computers.

12. The system as claimed in claim 7, wherein said engine for scheduling a computer to execute the application correlates the stored utilization data and hardware utilization time series, available resources, the applications running on each computer in the cluster of computers with their current cluster resource consumption rates and history, the submission policies and user requirements.

13. A computer program product for scheduling applications for use in a clustered computer system comprising a plurality of computers and at least one resource, the clustered computer system executing one or more applications, the computer program product comprising:

a computer readable storage medium having computer readable program code embodied therewith, the computer readable program code adapted to:

monitor one or more hardware counters in at least one of the at least one resource and the plurality of computers of the clustered computer system for each of the one or more applications;

determine the utilization of at least one of the at least one resource and the plurality of computers of the clustered computer system by each of the one or more applications;

for each of the one or more applications, store said utilization of at least one of the at least one resource and the plurality of computers of the clustered computer system; and in response to receiving a request to schedule an application on one of said plurality of computers, schedule a selected computer to execute the application based on said stored utilization for the application and stored utilizations of other applications executing on the plurality of computers, wherein the selected computer is determined by identifying applications on the plurality of computers that are compatible with the application to be scheduled, and assigning the application to a computer having a compatible application;

wherein applications are deemed compatible if each application utilizes predominately different resources.

14. The computer program product as claimed in claim 13, wherein responsive to the application for which a scheduling request is received being an application being executed on the clustered computer system for a first time, estimate the utilization of at least one of the at least one resource and the plurality of computers of the clustered computer system.

15. The computer program product as claimed in claim 13, wherein utilization data from a plurality of resources and a plurality of computers of the clustered computer system is consolidated in a plurality of master agents before communication to a collector agent which carries out said storing said utilization data.

16. The computer program product as claimed in claim 13, wherein scheduling a computer to execute the application based on said stored utilization for the application and stored utilizations of other applications executing on the plurality of computers schedule a computer currently executing an application having complementary utilization of resources.

17. The computer program product as claimed in claim 13, further comprising estimating the effect on utilization rate and throughput of changes to the allocation of said at least one resource and said plurality of computers.

18. The computer program product as claimed in claim 13, wherein scheduling a computer to execute the application comprises correlating the stored utilization data and hardware utilization time series, available resources, the applications running on each computer in the cluster of computers with their current cluster resource consumption rates and history, the submission policies and user requirements.

* * * * *